(12) United States Patent
Kim et al.

(10) Patent No.: US 8,292,641 B2
(45) Date of Patent: Oct. 23, 2012

(54) CONTACT TERMINAL COVERING DEVICE

(75) Inventors: Jong-Hae Kim, Gyeonggi-do (KR); Chung-Keun Yoo, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/180,637

(22) Filed: Jul. 12, 2011

(65) Prior Publication Data

US 2012/0052703 A1  Mar. 1, 2012

(30) Foreign Application Priority Data

Aug. 27, 2010  (KR) .................. 10-2010-0083672

(51) Int. Cl.
*H01R 13/44* (2006.01)
(52) U.S. Cl. ....................................... 439/135
(58) Field of Classification Search .......... 439/135, 439/164, 15, 131
See application file for complete search history.

(56) References Cited

U.S. PATENT DOCUMENTS

| | | | | |
|---|---|---|---|---|
| 4,626,052 A * | 12/1986 | Rumble | ....................... | 439/173 |
| 6,480,390 B2 * | 11/2002 | Matsumiya et al. | .......... | 361/736 |
| 6,743,030 B2 * | 6/2004 | Lin et al. | ....................... | 439/131 |
| 7,001,192 B1 * | 2/2006 | Yeh | ................................. | 439/131 |
| 7,004,780 B1 * | 2/2006 | Wang | ............................. | 439/353 |
| 7,121,850 B2 * | 10/2006 | Yeh | ................................. | 439/131 |
| 7,787,243 B2 * | 8/2010 | Salazar et al. | ........... | 361/679.31 |
| 2004/0212966 A1 * | 10/2004 | Fisher et al. | ................. | 361/726 |

* cited by examiner

*Primary Examiner* — Tulsidas C Patel
*Assistant Examiner* — Phuongchi Nguyen
(74) *Attorney, Agent, or Firm* — Cha & Reiter, LLC

(57) ABSTRACT

Disclosed is a contact terminal closing device for a portable storage device. The disclosed contact terminal closing device includes: a contact terminal received in a housing; a guide frame; a push sliding knob coupled to the guide frame in such a manner that depending on whether the push sliding knob is manually pushed or not, the push sliding knob locks the contact terminal or releases the contact terminal from the locked state, the push sliding knob being moved in the longitudinal direction of the guide frame to manually retract the contact terminal into the housing or to manually extract the contact terminal from the housing; and one or more shielding members provided on the guide frame to be cooperatively moved depending on the movement of the push sliding knob, the shielding members being adapted to completely shield the contact terminal from the outside.

20 Claims, 9 Drawing Sheets

CONTACT TERMINAL COVERING DEVICE

CLAIM OF PRIORITY

This application claims the priority under 35 U.S.C. §119 of an application entitled "Contact Terminal Covering Device" filed in the Korean Intellectual Property Office on Aug. 27, 2010 and assigned Serial No. 10-2010-0083672, the contents of which are hereby incorporated by reference.

BACKGROUND OF THE INVENTION

1. Field of the Invention

The present invention relates to a portable storage device, and more particularly to a covering device for a contact terminal provided in a portable storage device, such as a USB.

2. Description of the Related Art

In general, USBs, external hard disk drives or the like are used as a portable data storage device and widely used as an auxiliary storage device for an MP3, a computer or a portable terminal since they are compact and convenient to carry. Such a USB is equipped with a terminal connector with a contact terminal for connecting it to a computer, a notebook computer, a mobile communication terminal or the like for data transmission. However, such a USB is not separately provided with contact terminal protection elements, or is provided with a separate cover for protecting its contact terminal from an external environment.

In addition, a conventional USB is typically equipped with a separate retraction/extraction mechanism so that the contact terminal of the USB can be received in the body thereof or can be extracted therefrom. That is, the contact terminal may be anchored to the body of the USB, and manually operated in a slide type motion, so that the contact terminal can be stored within the body but exposed to the exterior when the USB is not used and can be extracted to the outside of the body when the USB is used.

As described above, the conventional USB has a construction in which the contact terminal of the USB is exposed to an external environment which in turn causes a damage from external impact and allows external foreign matters to easily ingress into the contact terminal. Further, since the conventional USB is not equipped with a shielding means for the contact terminal, foreign matters can be easily introduced to the contact terminal. As such, when the contact terminal is received in the body of the USB, the foreign matters interferes with the storage function as well as data transmission.

SUMMARY OF THE INVENTION

Accordingly, the present invention has been made to solve the above-mentioned problems occurring in the prior art and provides additional advantages, by providing a cover device for a portable storage device having a contact connector with at least one contact terminal which can prevent the ingress of foreign matters, so that the reliability of the storage device can be improved.

Another aspect of the present invention is to provide a contact terminal closing device for a portable storage device which provides an esthetically pleasing appearance.

Another aspect of the present invention is to provide a contact terminal closing device for a portable storage device which is easy to open or close with sliding movement.

In accordance with an aspect of the present invention, a contact terminal closing device includes: a contact terminal received in a housing; a guide frame; a push sliding knob coupled to the guide frame in such a manner that depending on whether the push sliding knob is manually pushed or not, the push sliding knob locks the contact terminal or releases the contact terminal from the locked state, the push sliding knob being moved in the longitudinal direction of the guide frame to manually retract the contact terminal into the housing or to manually extract the contact terminal from the housing; and one or more shielding members provided on the guide frame to be cooperatively moved depending on the movement of the push sliding knob, the shielding members being adapted to shield the contact terminal from the outside.

The push sliding knob may be integrally connected to the contact terminal by a contact terminal frame, a support frame joined on the contact terminal frame, and an auxiliary frame provided on the support frame and coupled to the guide frame to be moved along the guide frame, so that the pushing sliding knob can be moved with the contact terminal and the auxiliary frame conduces an upward or downward movement depending on whether the push sliding knob is pushed or not.

Further, the push sliding knob may be provided with a restoration force for moving the push sliding knob vertically upward by a first elastic means arranged between the support frame and the auxiliary frame. When the push sliding knob is pushed, the locked state is released. When the pushing force is removed, the locked state is maintained by the push sliding knob.

The guide frame may include: guide paths extending longitudinally to allow the movement of the auxiliary frame; protrusion type lockers provided on the guide paths to prevent the movement of the auxiliary frame; and guide rails extending parallel to each other along the bottom sides of the guide paths to support the movement of the support frame. At the opposite sides of the guide paths with reference to the lockers, the push sliding knob is moved upward or downward to lock the retracted or extracted contact terminal or to release the contact terminal from the locked state.

The lockers may be integrally formed to protrude toward one another.

The shielding members may be configured in a pair to be oppositely parallel to each other and have slopes at the inner corners thereof so as to ensure the smooth sliding movement of the push sliding knob. The shielding members may be provided with force for urging them to come into close contact with each other by the elastic force of a second elastic means, so that the shielding members can shield the contact terminal from the outside in the state in which the contact terminal is retracted.

The shielding members are adapted to be reciprocated in the direction perpendicular to the sliding direction of the contact terminal by a plurality of guide members coupled to the guide frame.

The second elastic means may be anchored to the shielding members at one end thereof and to the guide frame at the other end, so as to provide an elastic force for urging the shielding members to come into close contact with each other.

The second elastic means may consist of a plurality of tension springs, in which first and second tension springs are symmetrically arranged to form a first elastic unit, and third and fourth springs are symmetrically arranged to form a second elastic unit, so that the first and second elastic units balancedly provide a force for urging the shielding members to come into close contact with each other.

The shielding members may be formed from a thin metallic material.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
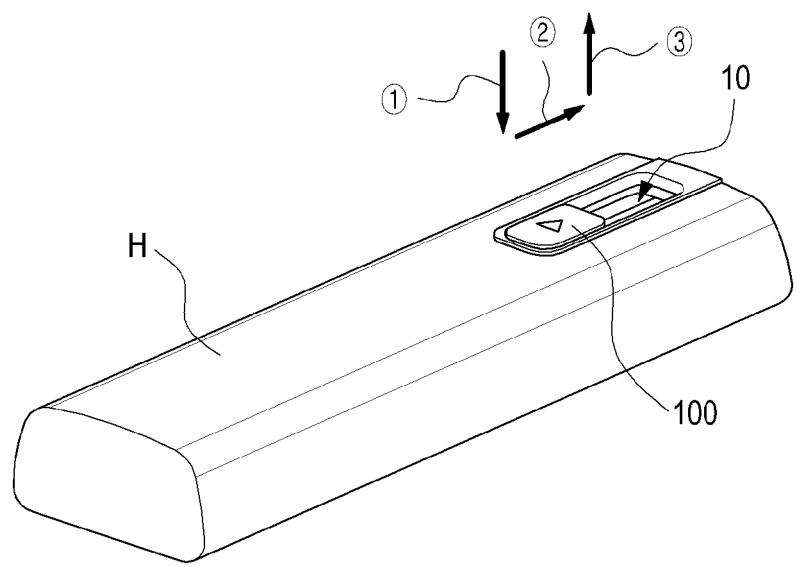
FIG. 1 is a perspective view showing an external appearance of a portable storage device in which the inventive contact terminal covering device is employed.

Hereinafter, embodiments of the present invention will be described with reference to the accompanying drawings. In the following description, the same elements will be designated by the same reference numerals although they are shown in different drawings. For the purposes of clarity and simplicity, a detailed description of well-known functions and configurations incorporated herein will be omitted as it may make the subject matter of the present invention unclear.

Figure 2:
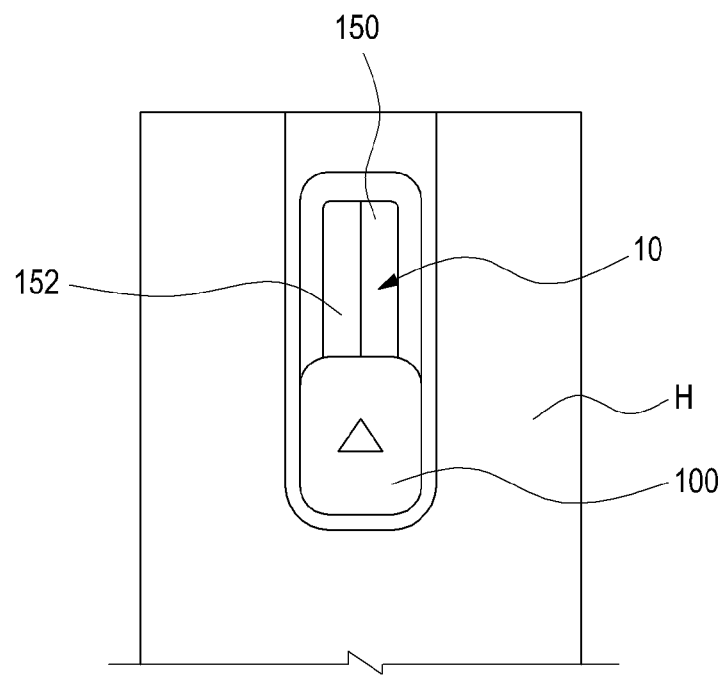
FIG. 2 is a top plan view of FIG. 1.

FIG. 1 is a perspective view showing an external appearance of a portable storage device in which the inventive contact terminal covering device 10 is employed, and FIG. 2 is a top plan view of the portable storage device shown in FIG. 1. As shown in FIGS. 1 and 2, the external appearance of the portable storage device is generally formed by a housing H in a bar shape. The inventive contact terminal covering device 10 is provided at one end of the housing H. FIG. 2 shows a push sliding knob 100 of the contact terminal covering device 10, and shielding members 150 and 152 exposed to the outside.

As shown in FIG. 1, the push sliding knob 100 can be moved in the directions indicated by arrows ①, ② and ③ on the housing H, in which the arrow ① direction indicates the push direction for moving the push sliding knob 100 so as to release the contact terminal C from its locked state, the arrow ② direction indicates a sliding direction for moving the push sliding knob 100 so as to extract the contact terminal C released from the locked state (see FIG. 3*b*) to the outside of the housing H, and the arrow ③ direction indicates a release direction for moving the push sliding knob 100 so as to fully extract and lock the contact terminal C released from its locked state. The arrow ① and ② directions indicate vertically up and down directions, respectively, and the arrow ② direction indicates the longitudinal direction of the housing H.

Referring to FIGS. 1 to 3, the contact terminal covering device 10 is operated in the following sequence: the top end of the push sliding knob 100 is pushed in the arrow ① direction (downward) in the initial stage (in the state in which no force is applied, as shown in FIGS. 1 and 2), then the contact terminal covering device 10 is slid in the arrow ② direction (in the longitudinal direction of the body housing), and then the force applied to the push sliding knob 100 is completely removed, thereby allowing the contact terminal to be moved in the arrow ③ direction.

Figure 3A:
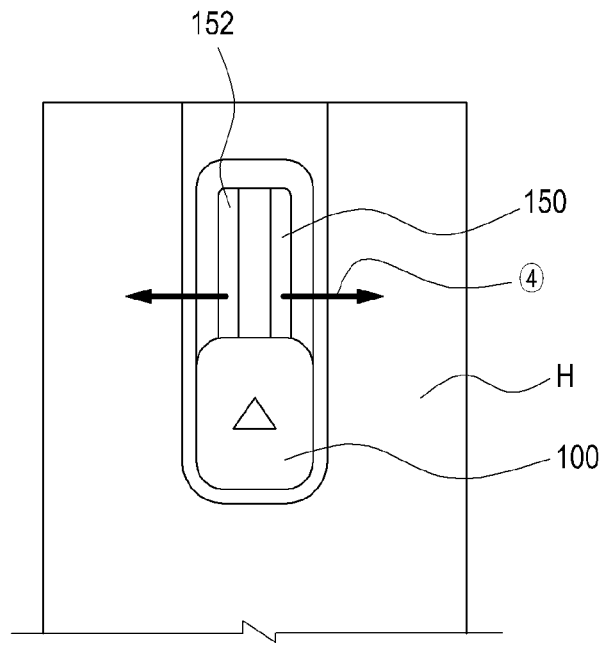
FIG. 3*a* is a top plan view showing a state in which the inventive contact terminal covering device is released from the locked state and the contact terminal covering device is ready for sliding movement.
Figure 3B:
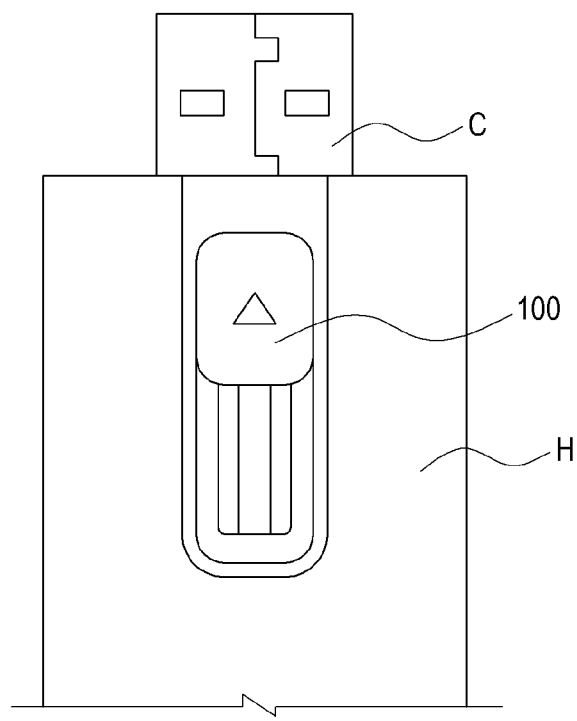
FIG. 3*b* is a top plan view showing a state in which the sliding movement of the inventive contact terminal covering device is completed and the contact terminal is extracted.
Figure 4:
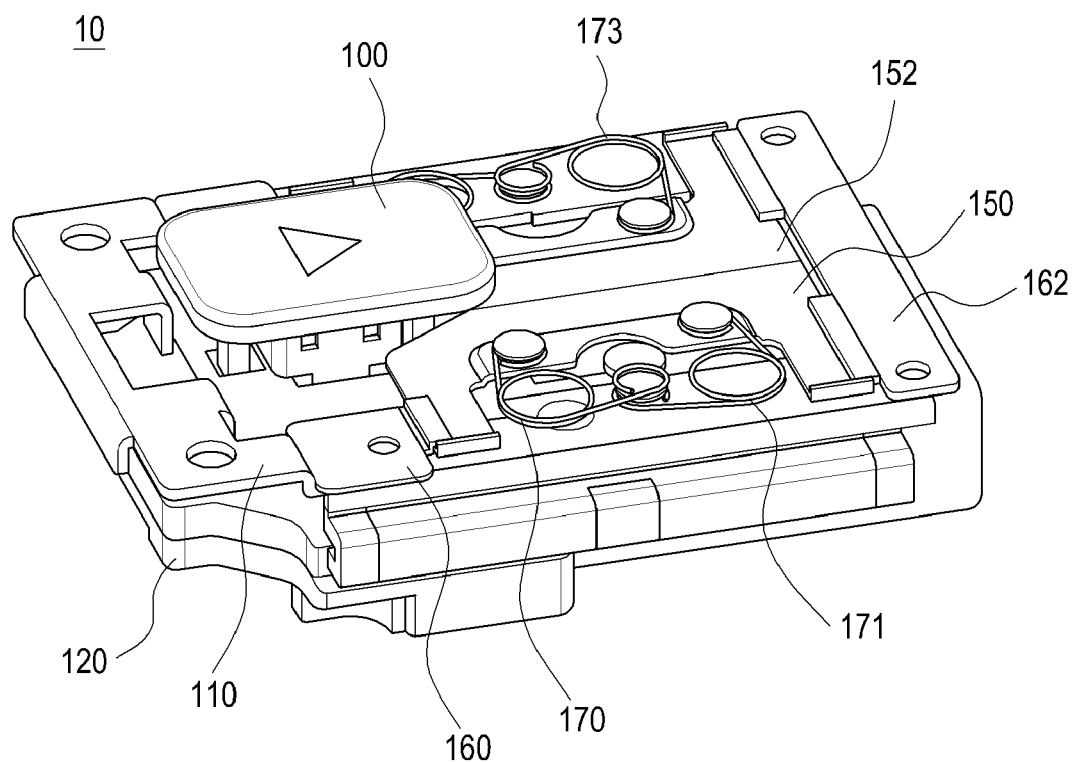
FIG. 4 is a perspective view showing the external appearance of the inventive contact terminal covering device.
Figure 5:
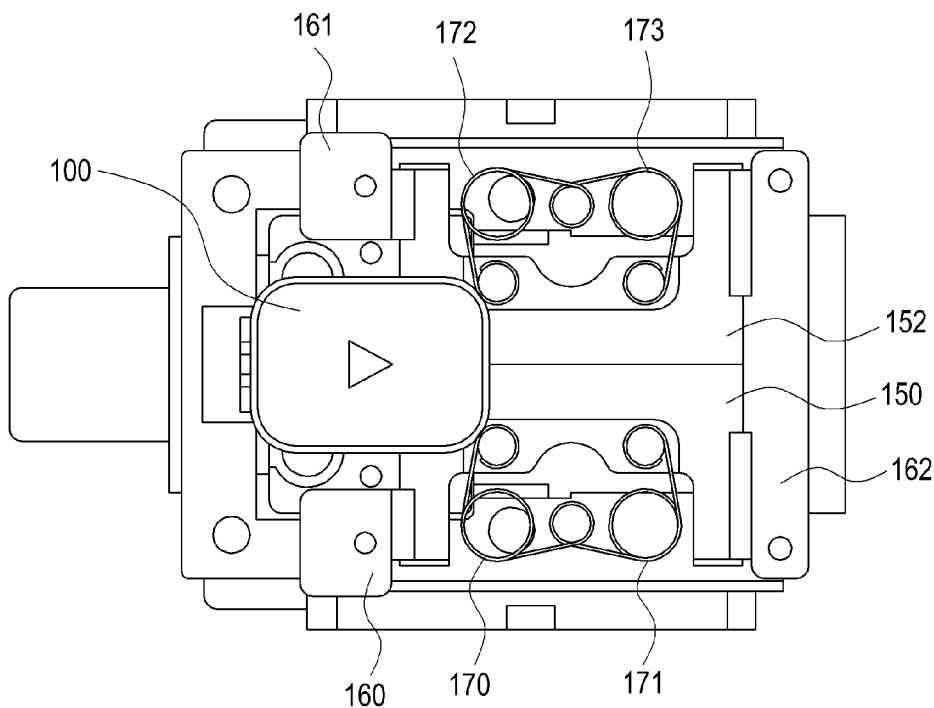
FIG. 5 is a top plan view of FIG. 4.
Figure 6:
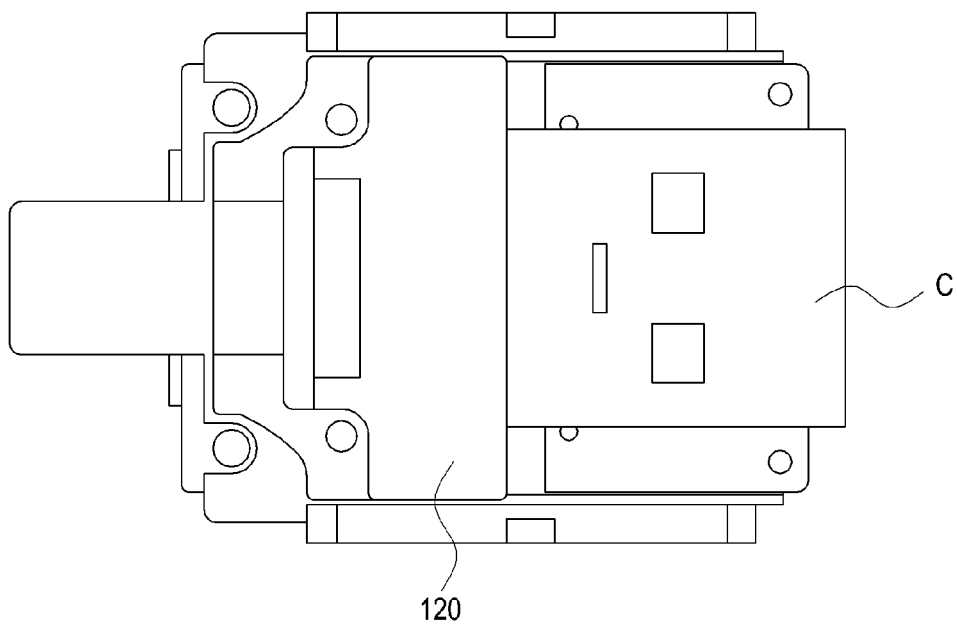
FIG. 6 is a bottom view of FIG. 4.

In operation, the push sliding knob 100 maintains the locked state of the contact terminal in the initial stage, the contact terminal is released from the locked state as the push sliding knob 100 slides, and after the push sliding knob 100 is moved vertically, the locked state of the contact terminal (in the state as shown in FIG. 3*b*) is again maintained. In other word, the push sliding knob 100 maintains the locked state of the contact terminal in the initial and final stages, and upon being exerted to slide, the push sliding knob completely releases the contact terminal from the locked state.

FIG. 2 shows a state in which the contact terminal is completely shielded from an external environment by the shielding members, FIG. 3*a* shows a state in which the shielding members are being slid in the opposite directions as indicated by arrow ④, and FIG. 3*b* shows a state in which the contact terminal is completely extracted. In sum, the contact terminal C has a construction in which as the force is exerted to the push sliding knob 100 by the user, the contact terminal C is extracted to the outside from the state in which it is completely received in the housing H. Further, when unused, the contact terminal C is retracted back into and stored in the housing H. As a result, the contact terminal covering device 10 is adapted to shield the contact terminal C received in the housing H from the external environment.

Hereinafter, the contact terminal locking mechanism will be described below. In particular, the specific construction of the inventive contact terminal covering device will be described with reference to FIGS. 4 to 7.

As shown in FIGS. 4 to 7, the contact terminal covering device 10 is mounted within the housing of a portable device in such a manner that the contact terminal C is received in the housing H or exposed to the outside depending on the movement of the push sliding knob 10. When the contact terminal C is received in the housing H, the contact terminal covering device 10 shields the contact terminal C from the external environment.

The inventive covering device includes: the above-mentioned push sliding knob 100; a contact terminal frame 120 on which the contact terminal C is mounted; a guide frame 110; a support frame 130; an auxiliary frame 140; and shielding members 150 and 152.

The push sliding knob 100 is coupled to the guide frame 110 in such a manner that depending on the user's force, i.e. depending on whether the user manually pushes the push sliding knob 100 or not, the push sliding knob 100 locks the contact terminal C or releases the contact terminal C from the locked state. The contact terminal C can be manually retracted into or extracted from the housing H by sliding the push sliding knob 100 in the longitudinal direction of the guide frame 110. In addition, the push sliding knob 100 is adapted to be indirectly connected to the contact terminal C through the contact terminal frame 120, the support frame 130 and the auxiliary frame 140, so that the push sliding knob 100 can be moved together with the contact terminal C. The support frame 130 is coupled to the contact terminal frame 120. In addition, the auxiliary frame 140 is mounted on the support frame 130 in such a manner that depending on whether the push sliding knob 100 is pushed or not, the auxiliary frame 140 can be moved vertically upward or downward in a state in which it is received in the guide frame 110, and the auxiliary frame 140 is coupled to the guide frame 110 so that it can be moved along the guide frame 110. The support frame 140, on which the auxiliary frame 140 is arranged, serves to securely support the forward and backward movements as well as the upward and downward movements of the push sliding knob 100.

Figure 7:
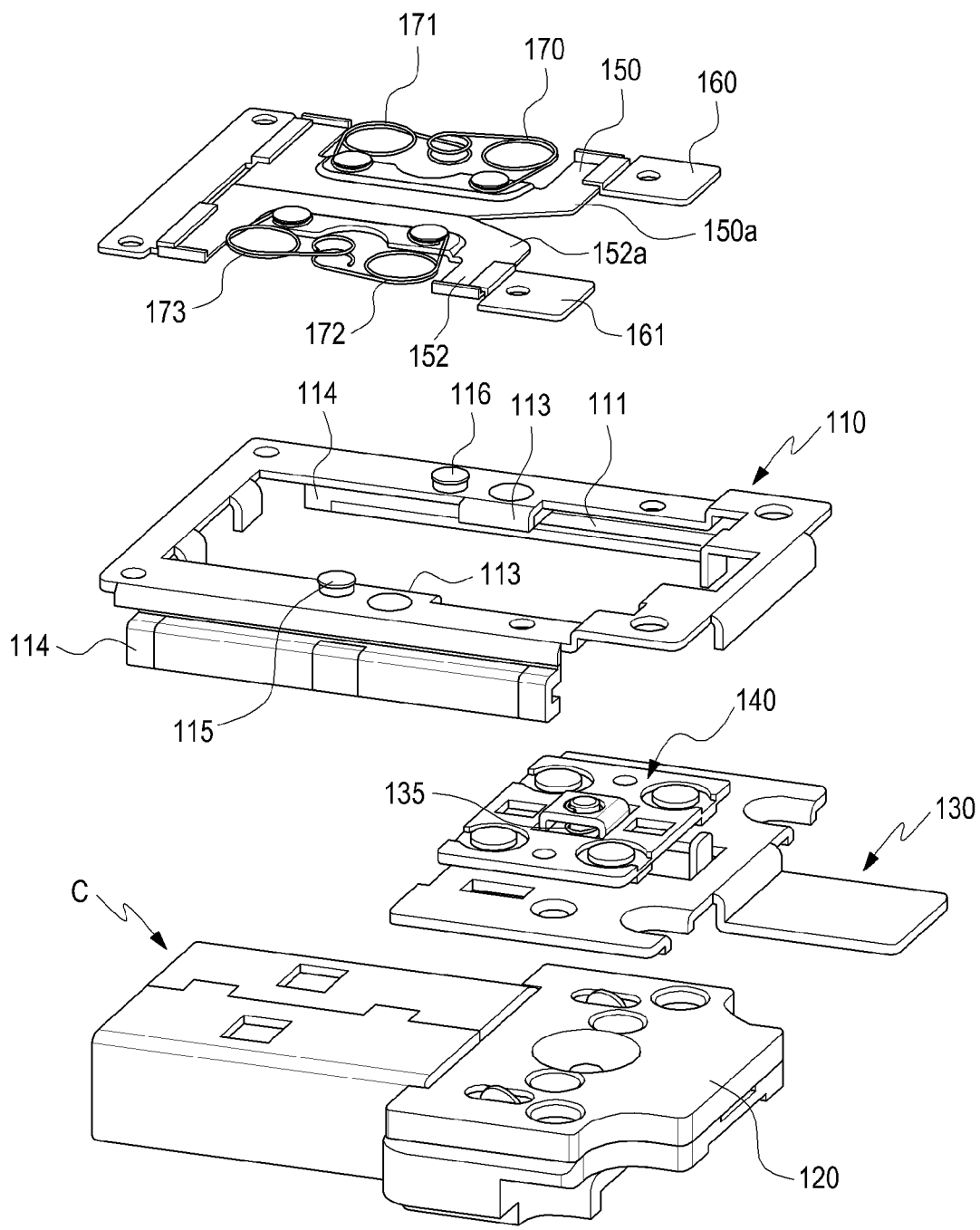
FIG. 7 is an exploded perspective view showing the construction of the inventive contact terminal covering device, from which a push sliding knob is removed.

As shown in FIG. 7, the guide frame 110 includes guide paths 111, protrusion-type lockers 113, and guide rails 114. The guide paths 111 extend in the longitudinal direction of the guide frame 110 to allow the movement of the auxiliary frame 140. The lockers 113 are provided at the central points of the guide paths 111, respectively, to limit the movement of the auxiliary frame 140. The guide rails 114 extend parallel to each other along the bottom sides of the guide paths to support the movement of the support frame 130. The guide paths 111, the lockers 113 and the guide rails 114 are symmetrically formed on the guide frame, respectively. In particular, the lockers 113, which were described as protrusion-type above, protrude toward one another. In addition, protrusions 115 and 116 are symmetrically formed on the top side of the guide frame 110 for anchoring the other end of a second elastic means (which will be described later).

With the above-mentioned arrangement, the push sliding knob 100 is moved upward or downward at the opposite sides of the guide paths 111 with reference to the lockers 113, thereby locking the retracted or extracted contact terminal C or releasing the contact terminal C from the locked state.

FIG. 7 shows a first elastic means 135 for supporting the upward and downward movements of the push sliding knob 100. The first elastic means 135 consists of coil spring type elastic members for providing a restoration force to the push sliding knob 100, and is arranged between the support frame 130 and the auxiliary frame 140 to be vertically compressed or tensioned. If the push sliding knob 100 is pushed, the first elastic means 135 is compressed, if the push sliding knob 100 is slid, the first elastic means 135 is slid together with the contact terminal in the compressed state, and if the sliding movement of the push sliding knob 100 is completed, the first elastic means 135 is tensioned again. The compressing or tensioning direction of the first elastic means 135 is the same with the upward or downward moving direction of the push sliding knob 100.

The shielding members 150 and 152 are provided on the guide frame 110 in such a manner that they are moved depending on the sliding movement of the push sliding knob 100. The shielding members 150 and 152 are protection means for shielding the contact terminal C retracted into the housing H from the external environment, wherein the shielding members 150 are arranged on the guide frame 110 in a pair to be oppositely parallel to each other. The shielding members 150 and 152 are provided with slopes 150a and 152a at the inner corners thereof, respectively, thereby assuring a smooth sliding movement of the push sliding knob 100. In the initial stage, the slopes 150a and 152a are maintained in the close contact state with the push sliding knob 100. In addition, the shielding members 150 and 152 are reciprocated in the direction perpendicular to the sliding direction of the contact terminal C by a plurality of guide members 160, 161 and 162 joined on the guide frame 100. The shielding members 150 and 152 are provided with an elastic force for urging them toward one another by the second elastic means, so that they can be maintained in the close contact state with the push sliding knob 100.

The second elastic means consists of a plurality of tension springs 170, 171, 172 and 173, in which one end of each tension spring is anchored to one of the shielding members 150 and 152, the other end is anchored to the guide frame 110 in such a manner that elastic force is provided to urge the shielding members 150 and 152 to come into close contact with each other. Specifically, the second elastic means consists of first and second elastic units, in which the first elastic unit consists of first and second tension springs 170 and 171, which are symmetrically arranged. The second elastic unit is arranged symmetrically to the first elastic unit, and consists of third and fourth tension springs 172 and 173, which are symmetrically arranged. Therefore, the first and second elastic units balancedly provide a force for urging the shielding members 150 and 152 to come into close contact with each other. The shielding members 150 and 152 are preferably formed from a thin metallic material.

Figure 8:
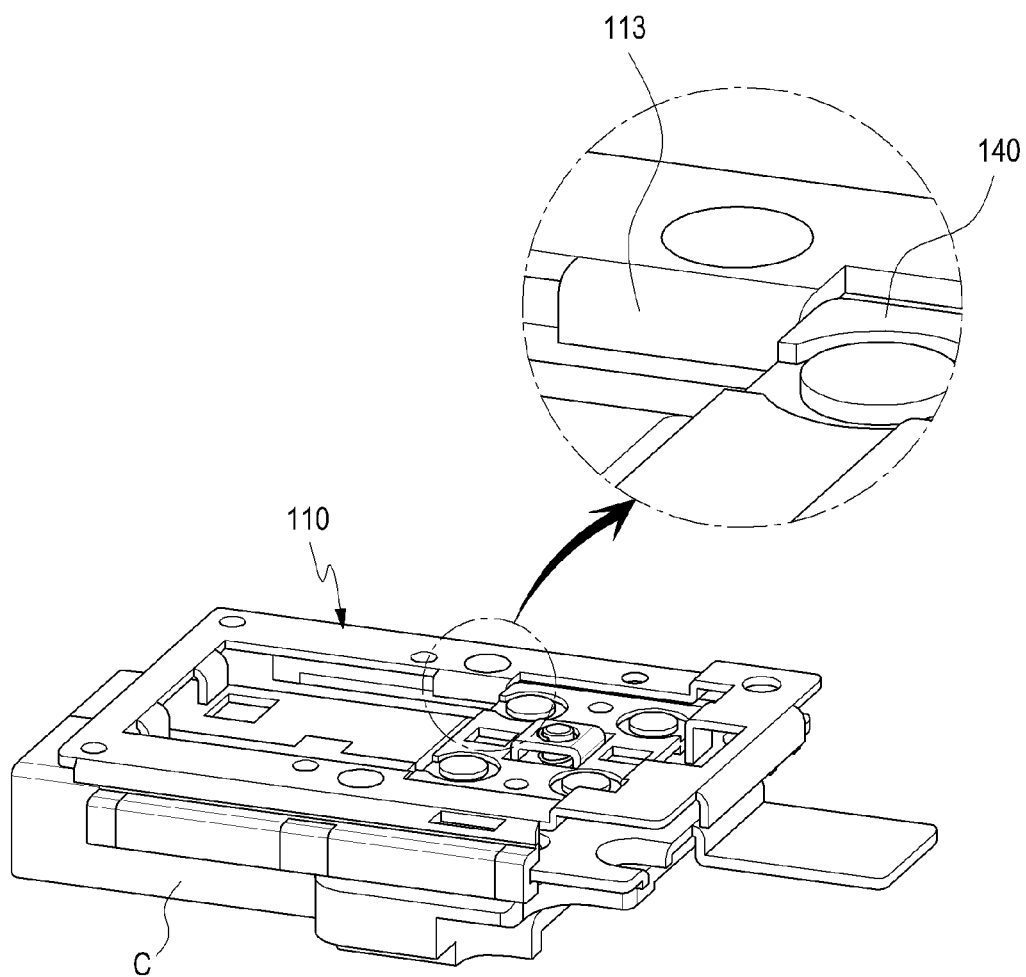
FIGS. 8 to 11 are views sequentially showing a procedure of opening the inventive contact terminal covering device.

The construction of the inventive contact terminal in the locked and unlocked states will be described with reference to FIGS. 8 to 11. FIG. 8 shows the contact terminal C in the initial stage, in which the contact terminal is locked. The auxiliary frame 140, to which the push sliding knob is coupled, is maintained in the locked state on the guide paths by the lockers 113 so that the auxiliary frame 140 cannot be moved in the longitudinal direction of the guide frame 110. This is because the moving paths of the auxiliary frame 140 are shut off by the lockers 113.

Figure 9:
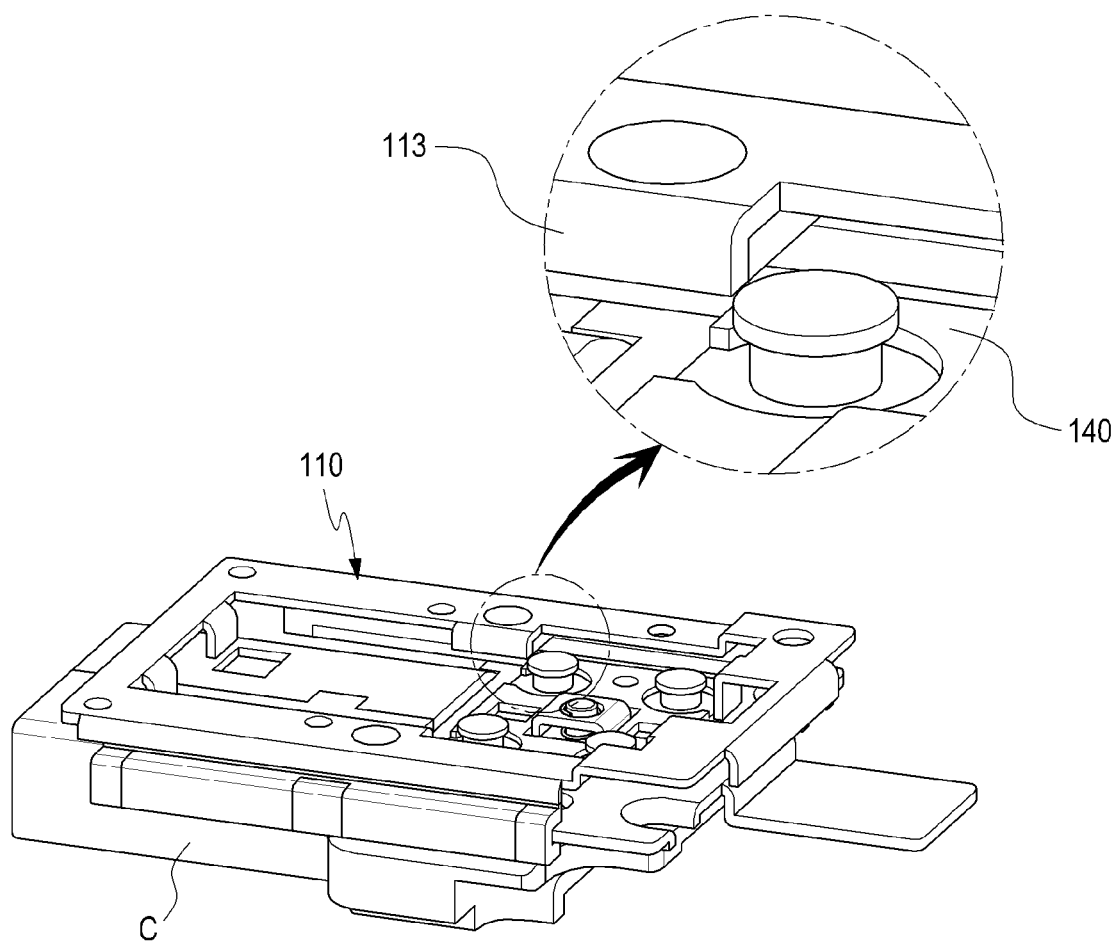

FIG. 9 shows a state in which the push sliding knob is pushed and the contact terminal C is released from the locked state. As shown in FIG. 9, if the push sliding knob is pushed, the auxiliary frame 140 is moved downward, and separated from the lockers 113. Therefore, the auxiliary frame 140 released from the locked state is positioned in a state in which it is capable of being moved toward the guide paths of the guide frame 110.

Figure 10:
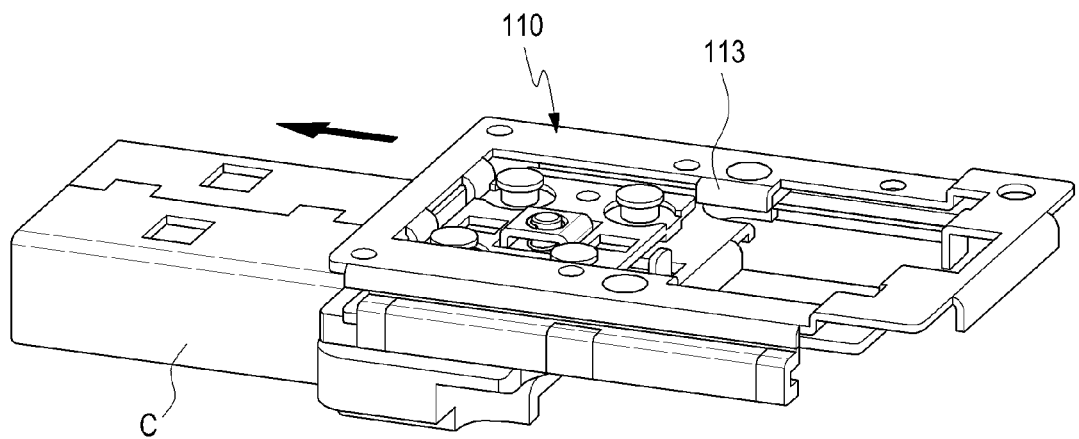

FIG. 10 shows the contact terminal during a sliding movement. As shown in FIG. 10, if a user manually pushes the push sliding knob to the front side of the portable storage device, the auxiliary frame 140 is positioned in a state in which it can be moved along the guide paths of the guide frame 110 below the lockers 113. In this state, the push sliding knob is maintained in a state in which it is compressed by the first elastic means (see FIG. 7).

Figure 11:
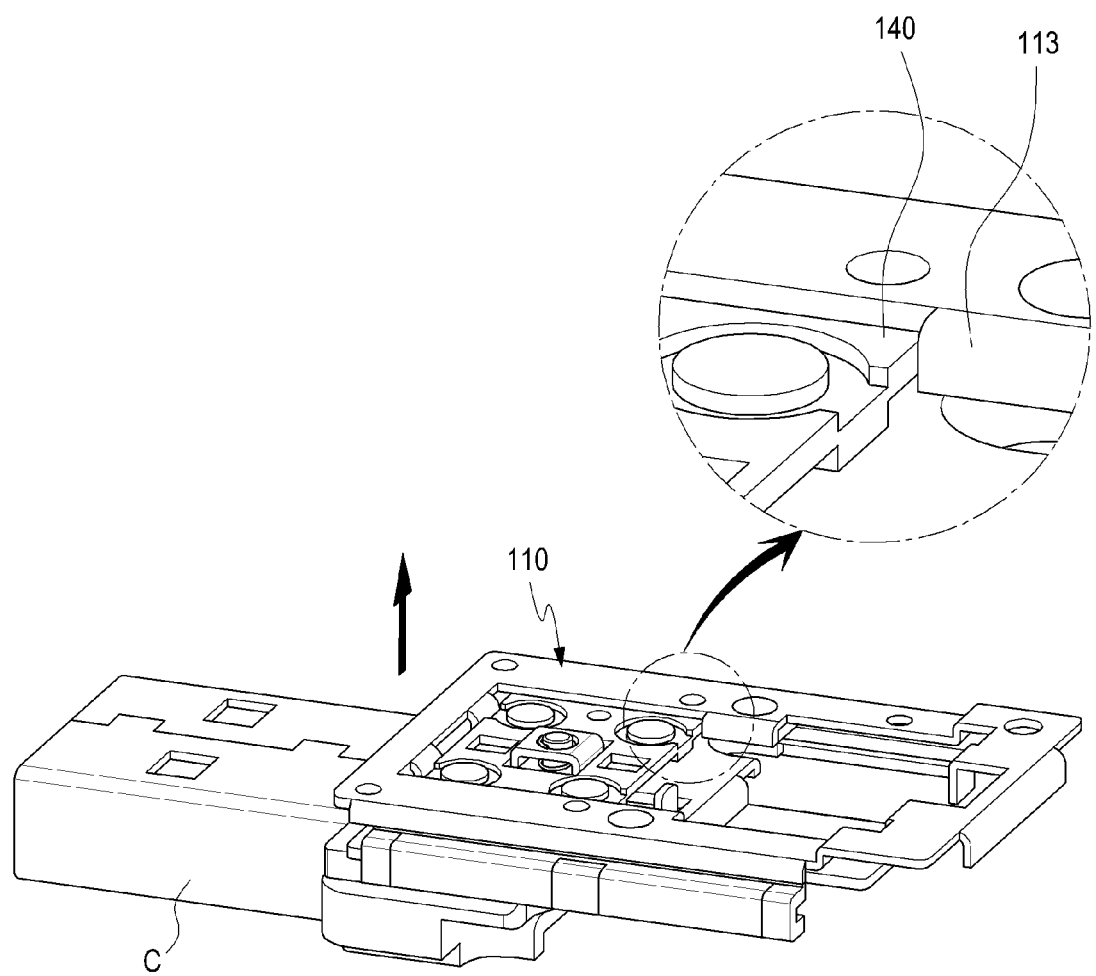

FIG. 11 shows a state in which the auxiliary frame 140 is not prevented from being moved upward by the lockers 113 after passing the lockers 113, and hence the auxiliary frame 140 is capable of being moved upward by the first elastic means. As shown in FIG. 11, the auxiliary frame 140 can be moved by the first elastic means which is not shown in the drawing. Of course, upon being moved upward, the auxiliary frame 140 is positioned in a state in which its movement is prevented by the lockers 113, and hence the contact terminal is maintained in the locked state.

As described above, the inventive contact terminal closing device facilitates the opening and closing of the contact terminal with a simple sliding movement while preventing the ingress of external foreign matters even during a closed, thus ensuring and maintaining a proper working of the storage device.

While the invention has been shown and described with reference to certain embodiments thereof, it will be understood by those skilled in the art that various changes in form and details may be made therein without departing from the spirit and scope of the invention as defined by the appended claims.

What is claimed is:

1. A storage device comprising:
a housing;
a contact terminal received in the housing;
a guide frame having a longitudinal length and including a locker;
an auxiliary frame including a push sliding knob, with the auxiliary frame slidably engaging the guide frame in such a manner that depending on whether the push sliding knob is manually pushed or not, the auxiliary frame contacts the locker to prevent longitudinal movement of the auxiliary frame, thereby locking the contact terminal in a locked state, or the auxiliary frame does not contact the locker to allow longitudinal movement of the auxiliary frame in the guide frame when the push sliding knob is moved, thereby unlocking the contact terminal from the locked state, the auxiliary frame being moved in a longitudinal direction along the longitudinal length of the guide frame to manually retract the contact terminal into the housing or to manually extract the contact terminal from the housing; and one or more shielding members provided on the guide frame to be cooperatively moved depending on the movement of the push sliding knob, the shielding members being adapted to shield the contact terminal from an exterior environment.

2. The storage device as claimed in claim 1, wherein the shielding members are formed from a thin metallic material.

3. The storage device as claimed in claim 1, wherein the push sliding knob is integrally coupled to the contact terminal by a contact terminal frame, a support frame joined on the contact terminal frame, and with the auxiliary frame provided on the support frame, so that the push sliding knob can be moved with the contact terminal, and the auxiliary frame slidably engages the guide frame to be moved along the guide frame, the auxiliary frame conducing upward or downward movement depending on whether the push sliding knob is pushed or not.

4. The storage device as claimed in claim 3, wherein the push sliding knob is provided with a restoration force for moving the push sliding knob vertically upward by a first elastic means arranged between the support frame and the auxiliary frame, and when the push sliding knob is pushed, the locked state is released, and when the pushing force is removed, the locked state is maintained by the push sliding knob.

5. The storage device as claimed in claim 3, wherein the guide frame comprises:
 guide paths extending longitudinally to allow the movement of the auxiliary frame;
 the locker including protrusion type lockers provided on the guide paths to prevent the movement of the auxiliary frame; and
 guide rails extending parallel to each other along the bottom sides of the guide paths to support the movement of the support frame, wherein at the opposite sides of the guide paths with reference to the lockers, the push sliding knob is moved upward or downward to lock the retracted or extracted contact terminal or to release the contact terminal from the locked state.

6. The storage device as claimed in claim 5, wherein the lockers are integrally formed to protrude toward one another.

7. The storage device as claimed in claim 1, wherein the shielding members are configured in a pair to be oppositely parallel to each other, and have slopes at the inner corners thereof so as to ensure a smooth sliding movement of the push sliding knob, the shielding members being provided with a force for urging them to come into close contact with each other by the elastic force of a second elastic means, so that the shielding members can shield the contact terminal from the outside in the state in which the contact terminal is retracted.

8. The storage device as claimed in claim 7, wherein the shielding members are adapted to be reciprocated in the direction perpendicular to the sliding direction of the contact terminal by a plurality of guide members coupled to the guide frame.

9. The storage device as claimed in claim 7, wherein the second elastic means is anchored to the shielding members at one end thereof, and to the guide frame at the other end, so as to provide an elastic force for urging the shielding members to come into close contact with each other.

10. The storage device as claimed in claim 7, wherein the second elastic means consists of a plurality of tension springs, in which first and second tension springs are symmetrically arranged to form a first elastic unit, and third and fourth springs are symmetrically arranged to form a second elastic unit, so that the first and second elastic units provide, in a balanced manner, a force for urging the shielding members to come into close contact with each other.

11. A storage device, comprising:
 a housing;
 a contact terminal provided in the housing;
 a guide frame at one end of the housing and having a longitudinal length and a locker;
 an auxiliary frame including a push sliding knob, with the auxiliary frame slidably engaging the guide frame to contact the locker to prevent longitudinal movement of the auxiliary frame, thereby locking the contact terminal in a locked state, or to have the auxiliary frame not contact the locker to allow longitudinal movement of the auxiliary frame in the guide frame when the push sliding knob is moved, thereby unlocking the contact terminal from the locked state, the auxiliary frame being moved in a longitudinal direction along the longitudinal length of the guide frame to manually retract the contact terminal into the housing or to manually extract the contact terminal from the housing; and
 one or more shielding members provided on the guide frame to be cooperatively moved depending on the movement of the push sliding knob,
 wherein the contact terminal is enclosed in the housing with the shielding members isolating the contact terminal from an exterior environment.

12. The storage device as claimed in claim 11, wherein the shielding members are formed from a thin metallic material.

13. The storage device as claimed in claim 11, wherein the push sliding knob is integrally coupled to the contact terminal via a contact terminal frame, a support frame joined on the contact terminal frame, and with the auxiliary frame provided on the support frame, so that the push sliding knob can be moved with the contact terminal and the auxiliary frame, slidably engaging the guide frame, can be moved along the guide frame.

14. The storage device as claimed in claim 13, wherein the push sliding knob is provided with a restoration force for moving the push sliding knob vertically upward by a first elastic means arranged between the support frame and the auxiliary frame,
 wherein when the push sliding knob is pushed, the locked state is released, and when the pushing force is removed, the locked state is maintained by the push sliding knob.

15. The storage device as claimed in claim 13, wherein the guide frame comprises:
 guide paths extending longitudinally to allow the movement of the auxiliary frame;
 the locker including protrusion type lockers provided on the guide paths to prevent the movement of the auxiliary frame; and
 guide rails extending parallel to each other along the bottom sides of the guide paths to support the movement of the support frame, wherein at the opposite sides of the guide paths with reference to the lockers, the push sliding knob is moved upward or downward to lock the retracted or extracted contact terminal or to release the contact terminal from the locked state.

16. The storage device as claimed in claim 15, wherein the lockers are integrally formed to protrude toward one another.

17. The storage device as claimed in claim 11, wherein the shielding members are configured in a pair to be oppositely parallel to each other, and have slopes at the inner corners thereof so as to ensure a smooth sliding movement of the push sliding knob, the shielding members being provided with a force for urging them to come into close contact with each other by the elastic force of a second elastic means, so that the shielding members can shield the contact terminal from the outside in the state in which the contact terminal is retracted.

18. The storage device as claimed in claim 17, wherein the shielding members are adapted to be reciprocated in the direction perpendicular to the sliding direction of the contact terminal by a plurality of guide members coupled to the guide frame.

19. The storage device as claimed in claim 17, wherein the second elastic means is anchored to the shielding members at one end thereof, and to the guide frame at the other end, so as to provide an elastic force for urging the shielding members to come into close contact with each other.

20. The storage device as claimed in claim 17, wherein the second elastic means consists of a plurality of tension springs, in which first and second tension springs are symmetrically arranged to form a first elastic unit, and third and fourth springs are symmetrically arranged to form a second elastic unit, so that the first and second elastic units provide, in a balanced manner, a force for urging the shielding members to come into close contact with each other.

* * * * *